UNITED STATES PATENT OFFICE.

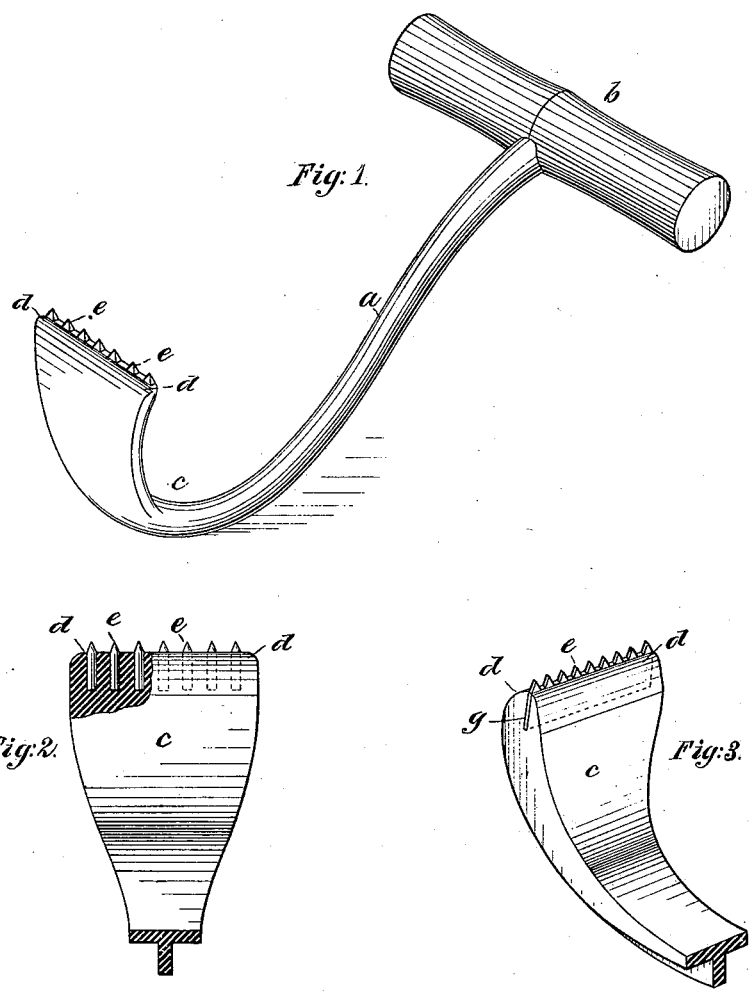

HENRY A. DIRKES, OF NEW YORK, N. Y.

BALE AND BOX HOOK.

SPECIFICATION forming part of Letters Patent No. 254,289, dated February 28, 1882.

Application filed August 31, 1881. (No model.)

*To all whom it may concern:*

Be it known that I, HENRY A. DIRKES, of New York city, New York, have invented certain new and useful Improvements in Bale and Box Hooks, of which the following is a specification.

My invention concerns those handled hooks, commonly termed "cotton-hooks," used by 'longshoremen, and by porters, cartmen, and others in handling or moving large bales or boxes of freight. Heretofore such hooks have been most commonly formed of a single rod of iron or steel, with a wooden handle fixed on one end and the opposite end bent into a hook having a single long tapering point, which is adapted to enter the bale to an unlimited depth. Owing therefore to the long point of such hooks, and its deep and unlimited penetration when applied to the bale, their use is hence allowable only on rough unmanufactured articles—
such as cotton, hair, rags, &c.—which would not be injured by perforation, while on bales or packages of manufactured goods—such as dry goods, paper, &c.—their use is forbidden, as they would penetrate the contents and seriously damage the whole. The handling of such bales, often large and heavy, without the aid of hooks is, however, inconvenient and much more laborious, as the unaided hand can obtain but a poor grasp thereon, and hence the moving about of such bales in carting or shipping calls for much more exertion on the part of the workmen, and is not accomplished as neatly or quickly as would be the case with hooks.

It has therefore been very desirable to obtain some hook or tool which would afford a firm grasp upon such bales or packages without penetrating or injuring their contents, and this object is accomplished by my improvement, which briefly consists in forming the hook at the point or tip end with a blunt bearing head or shoulder to abut against the exterior of the bale, and with one or more isolated points or teeth protruding from said bearing-head, and of limited projection—say equal to the outer covering of the bale—adapted to penetrate this covering without extending into the contents, whereby an extended superficial grasp is obtained upon or in the covering of the bale without perforating its contents, thus aiding the hand to get a firm grasp upon the bale without damaging the same.

My invention also consists in certain details of construction, as hereinafter set forth.

Figure 1 of the annexed drawings gives a perspective view of my improved hand-hook. Fig. 2 presents a fragmentary or cross-section, showing the hooked portion with some modifications. Figs. 3 and 4 are perspective views of the same portion, showing other modifications.

As shown in Fig. 1, the hook is preferably formed of about the usual length and general shape heretofore adopted. It may be made, as usual, of a round or square rod, *a*, of wrought iron or steel forged into shape, as illustrated, having a handle, *b*, riveted on one end at right angles to the rod, while the opposite end is bent into the usual hooked curve, *c*. The hooked end, however, which has heretofore tapered to a single long slender point, I form blunt and broad, so as to present a broad or extended bearing or abutting snout or head, *d*, as shown in Fig. 1, and also in the other figures, which head is adapted to abut against the exterior of the bale without entering the same at all. From this abutting head of the hook protrude one or more sharp points or teeth, *e e*, which project in isolated position from the surface of the head—that is, separate from each other—so that the abutting surface of the head extends between or around them, as shown in the several figures. These points or teeth, as may be seen, are of short or limited projection, and preferably only their tapering tips protrude from the bearing-surface of the head—say to the height of one-eighth of an inch, or less, which is about equal to or less than the thickness of the ordinary coverings of bales. It will hence be seen that when the improved hook is applied to a bale or package the limited isolated teeth *e e* will at once enter the covering at several points without reaching or penetrating the contents, while the abutting head *d* will bear or abut firmly against the exterior of the bale, the abutting surface thereof bearing upon the bale in an extended even manner around the roots of the points, thus preventing the bulging in of the exterior to any material extent and preventing the advance of the points farther into the bale. Hence by this means a broad extended grasp is obtained on the covering of the bale, and the teeth engage firmly in the texture of the covering without any danger of penetrating or injuring the goods within, thus enabling manufactured goods in bales or packages to be handled quickly and easily in carting, storing, or shipping without damage thereto, which has been heretofore an important item to the workmen engaged in their transition, as well as to the shippers or owners of the goods.

In Fig. 1, where the hook is presumed to be made by forging, the isolated teeth e e may be formed integral with the hook by cutting or filing; but this mode of formation I do not recommend, as the teeth are not so strong and are much more liable to break off, and cannot be readily restored. I therefore consider it preferable to form the teeth from pins of steel wire pointed at one end and driven into holes bored in the abutting head, as indicated in Fig. 2, as this will be a very strong and simple mode of construction. Again, in lieu of the latter mode, the teeth may be cut in a manner similar to saw-teeth, as seen in Fig. 3, on a thin piece of saw-plate, g, which may be tightly inserted in a narrow slot sawed or milled in the abutting head, as well illustrated in Fig. 3, this being a very advantageous construction.

Instead of either of the foregoing methods, the teeth may be formed, as shown in Fig. 4, by the pointed tips of slender screws h, screwed tightly at an inclination into the abutting head. In this case the protrusion of the teeth may be easily regulated more or less by screwing the screws in or out, and if the point of one is blunted or injured it may be easily removed and a new screw inserted.

Instead of forming the hook by forging from wrought metal, as heretofore, I prefer to cast it in cast-steel or malleable iron, and the modes of forming the teeth shown in Figs. 2, 3, and 4 are specially adapted to a cast construction of the hook, as will be readily appreciated. I prefer to make the casting with a T-shaped section, as shown in Figs. 2, 3, and 4, throughout the curve and body of the hook, thus enabling great strength to be obtained with a comparatively light casting. The thickness of the metal is increased at the head of the hook, as illustrated in Figs. 3 and 4, in order to form the broad abutting head d and to give greater strength to receive and hold the inserted teeth, as will be readily understood.

It may be also noted from the several figures that the portion of the abutting head on the outer or convex line of the hook is the more prominent, and extended in the form of a well-rounded bulge, while the portion on the inner or concave line of the hook is more narrow and receding, and nearly in line with the inner curve of the hook, the object of the latter being to allow the teeth to assume a more favorable angle to enter and grasp the bale when applied thereto.

It may now be readily appreciated that the hook when thus cast and provided with the abutting head and with the limited grasping-teeth inserted and formed as described provides not only a very cheap, strong, and durable tool, but one having a greatly improved action over the common hand-hooks heretofore used.

For a box-hook, or a hook to handle boxes or wooden packages, the tool may sometimes be made with a single tooth, in the manner shown in Fig. 4, the tooth or screw being, however, somewhat larger than where a series of teeth are used. A series of teeth is, however, preferable in all cases, as a stronger and more extended grasp on the wood is thereby obtained without appreciably denting the same.

It may be readily understood that in handling boxes or wooden packages the improved hook presents a similar advantage as in the case of bales, for a strong superficial grasp may be obtained on the wood of the box without deeply penetrating the same, or having any tendency to split the wood and injure the box or its contents, which sometimes happens with the common hooks, particularly where the wood is thin and the box heavy.

I am aware of the device shown in the Patent No. 119,203, of 1871, which I disclaim, and which is distinct from my improved bale-hook in that said device is simply an L-shaped iron having the foot of the L beaten into a thin blade, and the end or edge of this blade turned up at right angles and toothed, like a saw-blade. This device does not possess a proper hooked form which necessitates a return bend or curve of the grasping or point end toward the handle end of the hook, neither has it the blunt abutting head, nor the isolated and inserted teeth of my improved bale-hook, which render my hook a valuable improvement in this line.

What I claim is—

1. A box or bale hook having its grasping end terminated with a broad or blunt abutting tip or head provided with one or more sharp teeth protruding from said head, and of limited length, adapted to enter the covering of the bale without reaching its contents, while the blunt surface of the abutting head bears upon the exterior thereof around the roots of the teeth, substantially as and for the purpose herein shown and described.

2. A box or bale hook formed of wrought or cast metal, with its hooked portion formed with a broad or blunt abutting tip or head, and with one or more sharp teeth or spurs formed separate from the hook and tightly inserted in the blunt abutting tip with the points protruding therefrom, substantially as and for the purpose set forth.

3. A cast-metal box or bale hook cast with a T-shaped section throughout its stem or body, with an enlarged and blunt abutting head at the tip end of the hook, and one or more isolated sharp teeth protruding therefrom, substantially as herein shown and described.

4. A box or bale hook formed with a broad or blunt abutting head at the tip of the hook, and with one or more pointed screws screwed into said head with the point protruding from the blunt abutting tip, substantially as and for the purpose set forth.

HENRY A. DIRKES.

Witnesses:
CHAS. M. HIGGINS,
C. SPIRO.